No. 878,438. PATENTED FEB. 4, 1908.
H. E. VOSBURGH.
ANTIRATTLING DEVICE FOR THILL COUPLINGS.
APPLICATION FILED SEPT. 13, 1906.
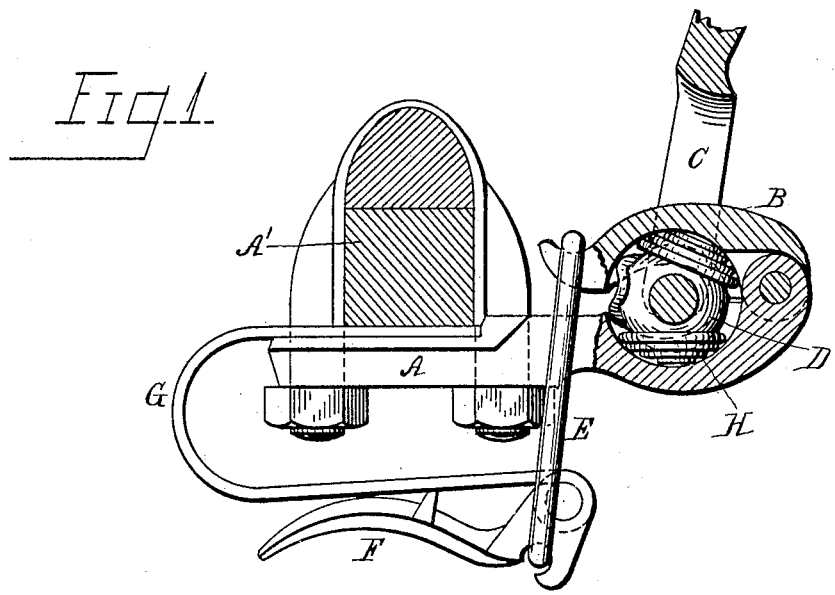
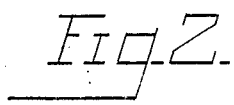
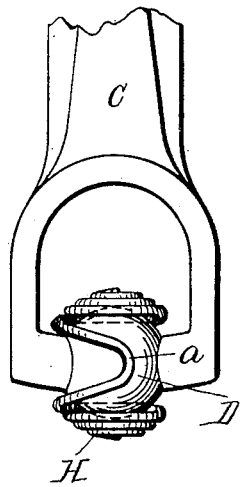

UNITED STATES PATENT OFFICE.

HENRY E. VOSBURGH, OF AUBURN, NEW YORK.

ANTIRATTLING DEVICE FOR THILL-COUPLINGS.

No. 878,438.      Specification of Letters Patent.      Patented Feb. 4, 1908.

Application filed September 13, 1906. Serial No. 334,467.

*To all whom it may concern:*

Be it known that I, HENRY E. VOSBURGH, a citizen of the United States, residing at Auburn, in the county of Cayuga and State of New York, have invented a new and useful Improvement in Antirattling Devices for Thill-Couplings, of which the following is a specification.

My invention relates to that class of devices employed to prevent rattling in thill or other couplings of a ball and socket construction; heretofore such devices have consisted of washers made of leather, rubber or similar materials, which, on account of the hard usage to which they are necessarily subjected, wear very rapidly and prove unsatisfactory and expensive.

The object of my invention is to provide a device to be applied to thill or other couplings that will prevent rattling, and at the same time be durable and inexpensive.

In the accompanying drawings Figure 1 is a side elevation of a well known style of thill-coupling, partly broken away to show the application of my device. Fig. 2 is a rear view of the thill-iron forming part of the coupling, showing my device thereon. Fig. 3 is a plan view of my device.

Similar letters refer to similar parts shown in the different views.

In thill-couplings of any description, it is necessary to provide some means to prevent the rattling of the parts that invariably occurs after the wear of constant usage. Heretofore leather and rubber washers have been employed for this purpose, but have proven not altogether satisfactory, on account of the rapidity with which they become worn, and, consequently, the necessity of replacing them with new ones.

The thill-coupling shown in the drawings, and to which my device is particularly applicable, is of a type well known in the trade, and which will be described sufficiently herein only to clearly show the application of my improvement.

The coupling proper consists of three parts A, B, and C. The part A is bolted to the front axle of a vehicle; the part C is attached directly to the thills, and has upon its lower end a ball or spherical enlargement D which rests in a socket formed in the forward portion of the part A, and in the part B which is pivotally secured to the forward end of the part A, and is held in a closed position by a link E which engages with the rearward end of the part B, and with the lower side of a lever F; a flat U shaped spring is secured between the axle A' and the part A, and projects downwardly and forwardly, its free end being bent to form a bearing for the lever F. It will be noted that the link E holds the part B in its normal position of use, through the pressure of the U shaped spring G, and it will be further noted that the pivot of the lever F is forward of the point of engagement of the lever and the link E, so that it is held in a locked position by the pressure of the spring G.

My improved device consists of a coiled spring H, enveloping the ball or spherical enlargement D, in such a manner as to present an even amount of pressure between the spherical enlargement D and the socket formed in the parts A and B. I have shown my device to consist of a coiled spring interrupted by a V-shaped bend *a*, but integral therewith, but I do not confine myself to this construction, as it is obvious that other forms of coiled springs can be employed. The spring H can be readily slipped upon the spherical enlargement D, which it fits loosely, until pressed into close contact with the surface of the spherical enlargement D and the socket in the parts A and B through the pressure of the spring G.

When the coiled spring H becomes worn to such an extent that it is necessary to replace it with another, the part C of the coupling can be readily removed from engagement with the parts A and B, by throwing downwardly and forwardly the lever F and so bringing the link E forward of the center of the bearing of the lever F, so that the link E can readily be removed from engagement with the part B, and the latter can be swung upward on its pivot, thus disengaging the part C.

By the use of my device I have found that at all times an even pressure is maintained between the spherical portion D of the part C and the socket in the parts A and B, a pressure that is maintained until the spring H is worn to such a degree as to render its replacement necessary.

It is very evident that, while a coiled spring is shown and preferably used, a flat spring can be bent to conform to the shape of the spherical portion D, experiment, however, has demonstrated that the coiled spring is the best for the purpose shown and described.

Having thus described my invention, what I claim and desire to secure by Letters Patent is:—

1. In a thill-coupling of the character described, having a spherical bearing and a socket therefor, a coiled spring interposed between the spherical bearing and the wall of the socket.

2. In a thill-coupling of the character described, having a spherical bearing and a socket therefor, a coiled spring enveloping the spherical bearing and adapted to control the spherical bearing in the socket.

3. In a thill-coupling of the character described, having a spherical bearing and a socket therefor, a coiled spring enveloping the spherical bearing, and held closely to the surface thereof by pressure from part of the socket.

4. In a coupling having a spherical bearing and a socket therefor, a coiled spring loosely enveloping the spherical bearing on opposite sides thereof and adapted to be clamped into close contact with the spherical bearing by the walls of the socket.

5. A coiled spring composed of two semispherical parts, their bases opposed and separated, and a connection between the bases.

6. A coiled spring composed of two semispherical parts, their bases opposed and separated, and a connection between the bases and integral therewith.

In testimony whereof I hereunto set my hand, this 10th day of September, 1906, in the presence of two attesting witnesses.

HENRY E. VOSBURGH.

Witnesses:
GEO. F. ADAMS,
R. L. BAUMLINE.